(12) United States Patent
Margallo Balbás

(10) Patent No.: US 11,016,195 B2
(45) Date of Patent: May 25, 2021

(54) APPARATUS AND METHOD FOR MANAGING COHERENT DETECTION FROM MULTIPLE APERTURES IN A LIDAR SYSTEM

(71) Applicant: Mouro Labs, S.L., Madrid (ES)

(72) Inventor: Eduardo Margallo Balbás, Tres Cantos (ES)

(73) Assignee: MOURO LABS, S.L., Madrid (ES)

( * ) Notice: Subject to any disclaimer, the term of this patent is extended or adjusted under 35 U.S.C. 154(b) by 0 days.

(21) Appl. No.: 16/977,208

(22) PCT Filed: Apr. 23, 2020

(86) PCT No.: PCT/EP2020/061330
§ 371 (c)(1),
(2) Date: Sep. 1, 2020

(87) PCT Pub. No.: WO2020/216842
PCT Pub. Date: Oct. 29, 2020

(65) Prior Publication Data
US 2021/0072384 A1    Mar. 11, 2021

Related U.S. Application Data

(60) Provisional application No. 62/839,114, filed on Apr. 26, 2019.

(51) Int. Cl.
*G01S 17/32* (2020.01)
*G01S 17/42* (2006.01)
(Continued)

(52) U.S. Cl.
CPC ............ *G01S 17/32* (2013.01); *G01S 7/4816* (2013.01); *G01S 7/4818* (2013.01);
(Continued)

(58) Field of Classification Search
CPC ................................. G01S 17/32; G01S 17/42
See application file for complete search history.

(56) References Cited

U.S. PATENT DOCUMENTS

| | | |
|---|---|---|
| 2009/0237640 A1 | 9/2009 | Krikorian et al. |
| 2016/0109699 A1* | 4/2016 | Margallo Baibas ........................ G02B 6/12004 359/201.2 |

(Continued)

FOREIGN PATENT DOCUMENTS

WO    2018221310 A1    12/2018

OTHER PUBLICATIONS

International Search Report and Written Opinion received for PCT Application No. PCT/EP2020/061330, dated Jun. 29, 2020. 17 pages.

*Primary Examiner* — Eric L Bolda
(74) *Attorney, Agent, or Firm* — Finch & Maloney PLLC

(57) ABSTRACT

An aperture array comprises apertures arranged over one or more dimensions. Each aperture is configured to receive a respective portion of a received optical wavefront. Each aperture is coupled to a respective optical mixer that coherently interferes the respective portion of the received optical wavefront with a respective local oscillator optical wave. A processing module is configured to process electrical signals detected from outputs of the optical mixers, including: for each optical mixer, determining at least one phase/amplitude information from at least one electrical signal detected from at least one output of that optical mixer, determining direction-based information, associated with a subset of the field of view, based on phase/amplitude information derived from at least two optical mixers of the plurality of optical mixers, and determining distance information from the direction-based information.

32 Claims, 10 Drawing Sheets

(51) Int. Cl.
  *G01S 7/497*   (2006.01)
  *G01S 7/481*   (2006.01)
  *G01S 7/4863*  (2020.01)

(52) U.S. Cl.
  CPC ............ *G01S 7/4863* (2013.01); *G01S 7/497* (2013.01); *G01S 17/42* (2013.01)

(56) References Cited

U.S. PATENT DOCUMENTS

2018/0045818 A1   2/2018   Majumdar et al.
2018/0364336 A1   12/2018  Hosseini et al.
2020/0158833 A1   5/2020   Baba et al.

\* cited by examiner

0dB 21dB 43dB 64dB

0dB 19dB 37dB 56dB

APPARATUS AND METHOD FOR MANAGING COHERENT DETECTION FROM MULTIPLE APERTURES IN A LIDAR SYSTEM

OBJECT OF THE INVENTION

The present disclosure relates to optical signal detection system and methods, such as light detection and ranging (LiDAR) apparatus and method for detection using the same, and more particular to an apparatus and method for managing coherent detection from multiple apertures in a LiDAR system.

BACKGROUND OF THE INVENTION

A variety of types of LIDAR systems use various kinds of scene reconstruction techniques for operation. In some systems, focal plane arrays are used in an imaging configuration, where different parts of a field of view are imaged on different respective elements of the array. In some systems, coherent detection is used by mixing optical signals from different elements to select a given direction, adjustable through variable physical phase shifts between the elements, but the use of amplitude and phase information from such coherent detection may be limited in various ways.

DESCRIPTION OF THE INVENTION

In one aspect, in general, an apparatus includes: a first optical source or port providing a modulated illumination optical wave illuminating a field of view; a second optical source or port providing a reference optical wave that has a defined phase relationship to the modulated illumination optical wave; an aperture array that includes a plurality of apertures arranged over one or more dimensions, and that is configured to receive an optical wavefront that includes contributions over at least a portion of the field of view, where: each of two or more of the apertures is configured to receive a respective portion of the received optical wavefront, and at least two non-adjacent apertures in the aperture array are configured to receive a respective portion of the received optical wavefront that includes a contribution from the same portion of the field of view, and each of two or more of the apertures is coupled to a respective optical mixer that coherently interferes the respective portion of the received optical wavefront with a respective local oscillator optical wave; where each respective local oscillator wave is derived from the reference optical wave such that, for each respective aperture, respective differences in group delay, between (i) the second optical source or port and the respective optical mixer, and (ii) the respective aperture and the respective optical mixer, are substantially equal.

The apparatus also comprises a processing module configured to process electrical signals detected from outputs of the optical mixers, the processing comprising: for each optical mixer of a plurality of the optical mixers, determining at least one of phase or amplitude information from at least one electrical signal detected from at least one output of that optical mixer, determining first direction-based information, associated with a first subset of the field of view, based on phase or amplitude information derived from at least two optical mixers of the plurality of the optical mixers, determining first distance information from the first direction-based information, determining second direction-based information, associated with a second subset of the field of view, based on phase or amplitude information derived from at least two optical mixers of the plurality of the optical mixers, and determining second distance information from the second direction-based information.

In another aspect, in general a method for managing coherent detection from multiple apertures includes: providing, from a first optical source or port, a modulated illumination optical wave illuminating a field of view; providing, from a second optical source or port, a reference optical wave that has a defined phase relationship to the modulated illumination optical wave; receiving an optical wavefront that includes contributions over at least a portion of the field of view at an aperture array that includes a plurality of apertures arranged over one or more dimensions, where: each of two or more of the apertures is configured to receive a respective portion of the received optical wavefront, and at least two non-adjacent apertures in the aperture array are configured to receive a respective portion of the received optical wavefront that includes a contribution from the same portion of the field of view, and each of two or more of the apertures is coupled to a respective optical mixer that coherently interferes the respective portion of the received optical wavefront with a respective local oscillator optical wave.

Each respective local oscillator wave is derived from the reference optical wave such that, for each respective aperture, respective differences in group delay, between (i) the second optical source or port and the respective optical mixer, and (ii) the respective aperture and the respective optical mixer, are substantially equal.

The method also comprises: processing, in a processing module, electrical signals detected from outputs of the optical mixers, the processing including: for each optical mixer of a plurality of the optical mixers, determining at least one of phase or amplitude information from at least one electrical signal detected from at least one output of that optical mixer, determining first direction-based information, associated with a first subset of the field of view, based on phase or amplitude information derived from at least two optical mixers of the plurality of the optical mixers, determining first distance information from the first direction-based information, determining second direction-based information, associated with a second subset of the field of view, based on phase or amplitude information derived from at least two optical mixers of the plurality of the optical mixers, and determining second distance information from the second direction-based information.

In another aspect, in general, an apparatus comprises: a first optical source or port providing a modulated illumination optical wave illuminating a field of view; a second optical source or port providing a reference optical wave that has a defined phase relationship to the modulated illumination optical wave; an aperture array that includes at least 40 apertures arranged over one or more dimensions, and that is configured to receive an optical wavefront that includes contributions over at least a portion of the field of view, where: each of two or more of the apertures is configured to receive a respective portion of the received optical wavefront, and at least two non-adjacent apertures in the aperture array are configured to receive a respective portion of the received optical wavefront that includes a contribution from the same portion of the field of view, and each of two or more of the apertures is coupled to a respective optical mixer that coherently interferes the respective portion of the received optical wavefront with a respective local oscillator optical wave derived from the reference optical wave; and a processing module configured to process electrical signals detected from outputs of the optical mixers, the processing including: for each optical mixer of a plurality of the optical mixers, determining at least one of phase or amplitude information from at least one electrical signal detected from at least one output of that optical mixer, determining first direction-based information, associated with a first subset of the field of view, based on phase or amplitude information derived from at least two optical mixers of the plurality of the optical mixers, determining first distance information from the first direction-based information, determining second direction-based information, associated with a second subset of the field of view, based on phase or amplitude information derived from at least two optical mixers of the plurality of the optical mixers, and determining second distance information from the second direction-based information.

Aspects can include one or more of the following features.

The modulated illumination optical wave has a frequency spectrum that includes a peak at a frequency that is tunable to provide a frequency modulated continuous wave (FMCW) illumination optical wave.

The modulated illumination optical wave is a pulsed signal.

The modulated illumination optical wave is formed by alternation of light of two wavelengths.

The modulated illumination optical wave has a spectrum covering different frequency bands.

The respective differences in group delay, between (1) the second optical source or port and the respective optical mixer, and (2) the respective aperture and the respective optical mixer, correspond to an optical path length difference of less than 10 cm, or less than 1 cm.

The first and second direction-based information is further processed to measure the first and second intensity of the light coming from the first and second subsets of the field of view, respectively.

The first and second direction-based information is further processed to measure the relative speed of the objects reflecting the light coming from the first and second subset of the field of view, respectively.

At least a portion of the first direction-based information and at least a portion of the second direction-based information are determined in parallel.

The illumination optical wave is provided to illuminate the entire field of view at the same time.

The illumination optical wave is provided to scan different portions of the field of view over time.

One or more of the apertures in the aperture array are used to emit at least a portion of the illumination optical wave.

The apparatus further includes at least one illumination aperture that is not included in the aperture array, where the illumination aperture is configured to emit at least a portion of the illumination optical wave.

The aperture array has its apertures disposed in a regularly spaced rectangular grid.

The aperture array has its apertures disposed in a regularly spaced polar grid.

The aperture array has its apertures disposed in a Mills cross configuration.

The aperture array has its apertures disposed in a pseudo-random configuration.

The aperture array is defined by the pixels of an imaging sensor.

The respective mixer is configured to provide in-phase/quadrature (I-Q) detection through the use of a 90° shifted replica of the reference optical wave.

The respective mixer is configured to provide in-phase/quadrature (I-Q) detection through the use of interference with the reference optical wave in a multimode interference coupler.

The mixers are implemented through at least one of: a partially transmissive layer, a directional coupler, an evanescent coupler, a multimode interference coupler, or a grating coupler.

The processing module is configured to compensate errors in the relative phase between apertures in the aperture array, estimated based at least in part on a modulation pattern of the modulated illumination optical wave.

The processing module is configured to compensate errors in the relative phase between apertures in the aperture array, estimated based at least in part on calibration data obtained with a predetermined wavefront.

The processing module is configured to compensate errors in the relative phase between apertures in the aperture array, estimated using sensors measuring temperature, and/or temperature gradients in the apparatus, and/or its environment.

The processing module includes analog to digital conversion components.

The processing module includes a data serializer.

The processing module includes an electro-optical transducer for data output through an optical fiber link The first optical source or port and the second optical source or port provide light from a single common light source.

The second optical source or port provides light by phase modulation of light fed to the first optical source or port.

The first optical source or port illuminates the field of view through a light diffusing element.

Aspects can have one or more of the following advantages.

Coherent detection for multiple apertures may use a single local oscillator in a way that preserves the relative phase information between the apertures, and may allow for the selection of any direction within a field of view through digital postprocessing of a single acquisition, without the need for physical beam steering.

Reconstruction of a desired wavefront or beam direction may be performed in post-processing, such as digital post-processing.

The amplitude and relative phase information from each aperture in the array can be recorded and stored digitally, and can be combined to produce a virtual beam steering and image scanning effect.

Heterodyne detection can be used to extract phase information between a number of apertures, and that information can be processed in the complex domain to separate different viewing directions. The distance and intensity of multiple contributions of different portions of the field of view may be resolved for each direction and in this way tomographic information may be reconstructed about a volume in the field of view.

The techniques described are compatible with integrated optics implementations.

Techniques can be used to minimize and estimate phase errors, which can be compensated, to facilitate good performance of the system.

A complete field of view may be imaged simultaneously, allowing for wide-field illumination, and hence higher illumination power, within allowable eye safety standards.

As a result of the higher illumination power that is tolerable, faster imaging, longer ranges, and/or higher resolution imaging may be achievable.

DESCRIPTION OF THE DRAWINGS

To complement the description being made and in order to aid towards a better understanding of the characteristics of the invention, in accordance with a preferred example of a practical embodiment thereof, a set of drawings is attached as an integral part of said description wherein, with illustrative and non-limiting character, the following has been represented.

PREFERRED EMBODIMENT OF THE INVENTION

Various examples of a LI DAR system (or LiDAR system) can be implemented based on a synthetic aperture formed from a known spatial distribution of individual collection apertures of a detection array coupled into receiving waveguides of a reception subsystem.

The field of the electromagnetic wave collected at each aperture (or "collected field"), after each electromagnetic wave has been coupled into a respective receiving waveguide, is mixed with a local oscillator (LO) field in a way such that the phase information of the collected field at the input of the aperture can be inferred and relative phase differences between apertures can be measured.

This can be done through the introduction of an in-phase/quadrature (IQ) optical demodulator that uses two 90° phase-shifted local oscillators, for example. Alternatively, the local oscillator can be frequency shifted relative to the frequency of the fields collected at the apertures so that relative phase differences between fields collected at apertures can be measured relative to a carrier frequency resulting from the frequency shift.

Figure 1A:
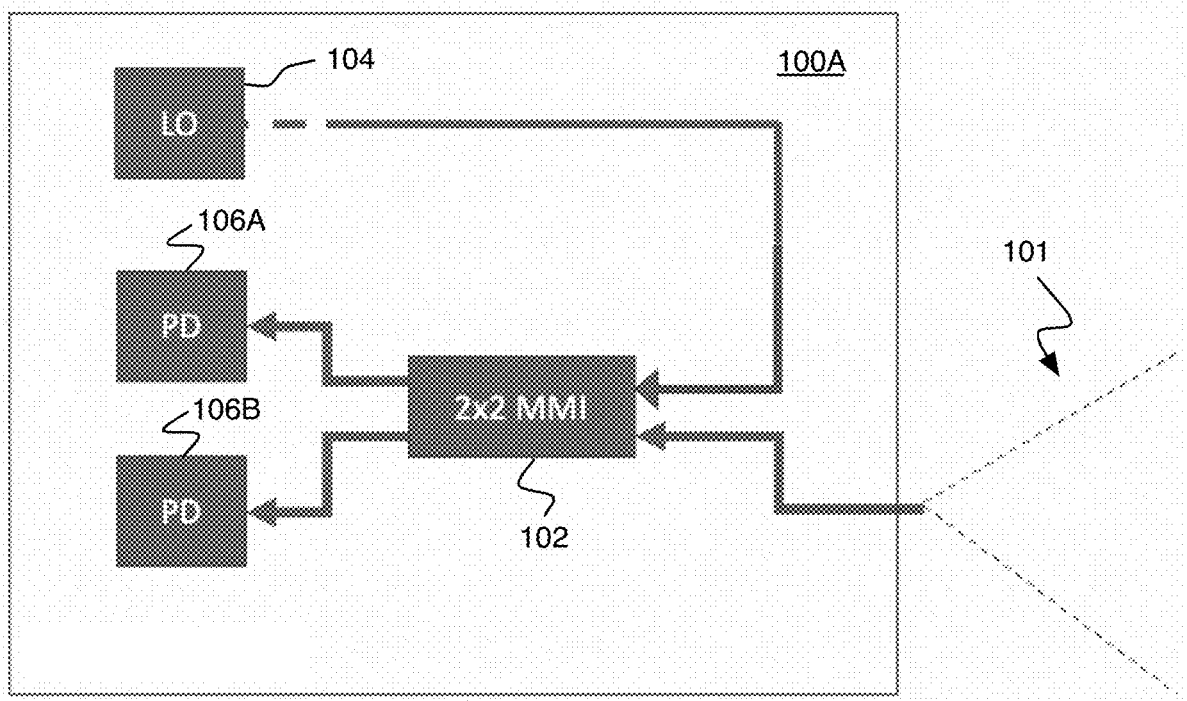
FIGS. 1A and 1B.—Show schematic diagrams of example coherent detection schemes to generate interference with a local oscillator using balanced detection, and unbalanced detection, respectively.
Figure 1B:
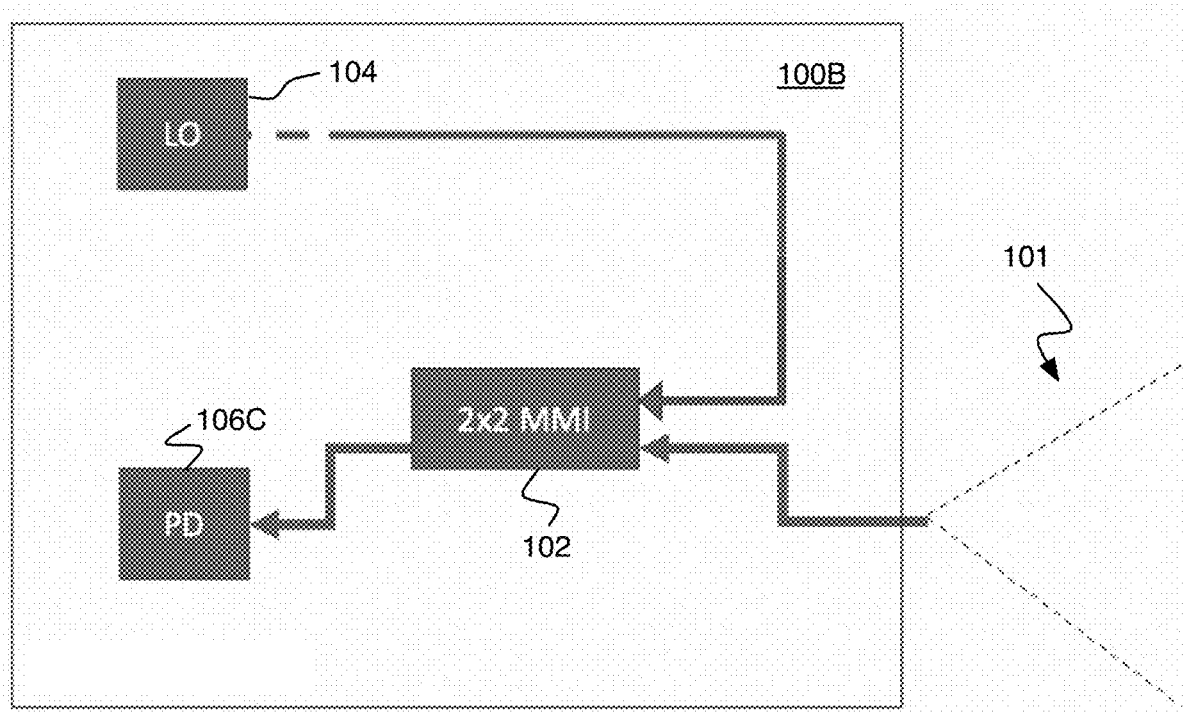

Example detection options are illustrated in FIGS. 1A and 1B. In FIG. 1A, a coherent detector (or "mixer") (100A) comprises a 2×2 coupler (102) (e.g., a multimode interference (MMI) coupler) used to produce a heterodyne mixing of a local oscillator (LO) from an LO source (104) and the field collected at an input aperture (101). Two detectors (106A) and (106B) (e.g., photodetectors such as photodiodes) are used to generate 180° shifted versions of the detected optical interference signals yielding photocurrents that are summed using balanced detection to yield a current representing a differential mode signal. This has the advantage of suppressing common mode elements in the signal that can increase noise and interference.

Alternatively, in FIG. 1B, a coherent detector (100B) comprises a single detector (106C) (e.g., a photodetector such as a photodiode), which could provide greater simplicity, with a tradeoff of losing the common mode suppression effect. A potential disadvantage of this unbalanced detection scheme instead of the balanced detection scheme is that, if the local oscillator field and the collected field are of the same frequency, the DC component of the interference on the detector (106C), which depends on the amplitude of the signals and on the phase shift between them, will be mixed with the non-interferent DC component of the un-balanced detection which depends mainly on the local oscillator amplitude. If there is a frequency shift between both due to frequency modulation of the LO, for example, it would then be possible to resolve both phase and amplitude of the collected field.

In any given implementation, the defined coupler (102) can be an MMI, an evanescent coupler or any other form of suitable coupler. The excess losses of these devices should be reduced in order to improve the sensitivity and increase the effective range of the system. The reduced number of devices found between the collection aperture and the detector helps reduce the effect of device excess losses, relative to for example the long binary trees typically used in phased arrays.

The electromagnetic waves used may have a peak wavelength that falls in a particular range of optical wavelengths (e.g., between about 100 nm to about 1 mm, or some subrange thereof), also referred to herein as simply "light."

The photodetectors can be implemented through PIN photodiodes, avalanche photodiodes, photomultiplier tubes and other light sensitive devices adequate for the application. In particular, they are at least sensitive to the wavelength of light used for the LIDAR system and possess sufficient bandwidth to allow readout of the signals of interest. The dark current and quantum efficiency of these photodetectors may be optimized to maximize the system sensitivity and range.

Figure 2A:
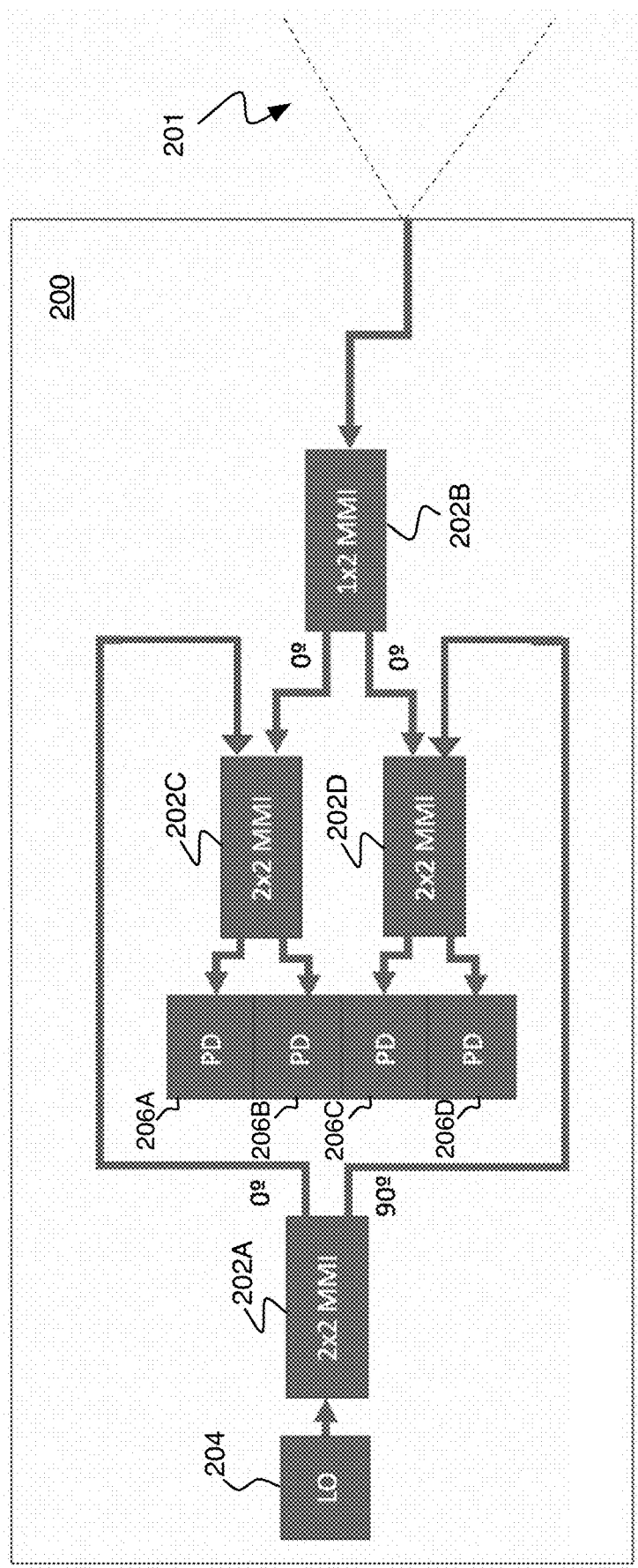
FIGS. 2A and 2B.—Show schematic diagrams of example coherent detection schemes in which a local oscillator is mixed with two copies of an incoming field.

Referring to FIG. 2A, in an alternative implementation of a coherent detector (200), a 2×2 coupler (202A) receives an LO optical wave from an LO source (204) and creates two versions of the local oscillators shifted by 90° with respect to each other. These shifted LOs are mixed, respectively, with two replicas of the incoming field generated by a 1×2 splitter (202B) that splits the incoming field from an input aperture (201) to two outputs, which does not generate phase shifts between the two outputs, to obtain IQ demodulation, in respective 2×2 couplers (202C) and (202D). The couplers (202A), (202B), (202C), and (202D) can be MMI couplers, for example. Four detectors (206A), (206B), (206C), and (206D) (e.g., photodetectors such as photodiodes) are used in this case for balanced detection of each of the I and Q channels.

Figure 2B:
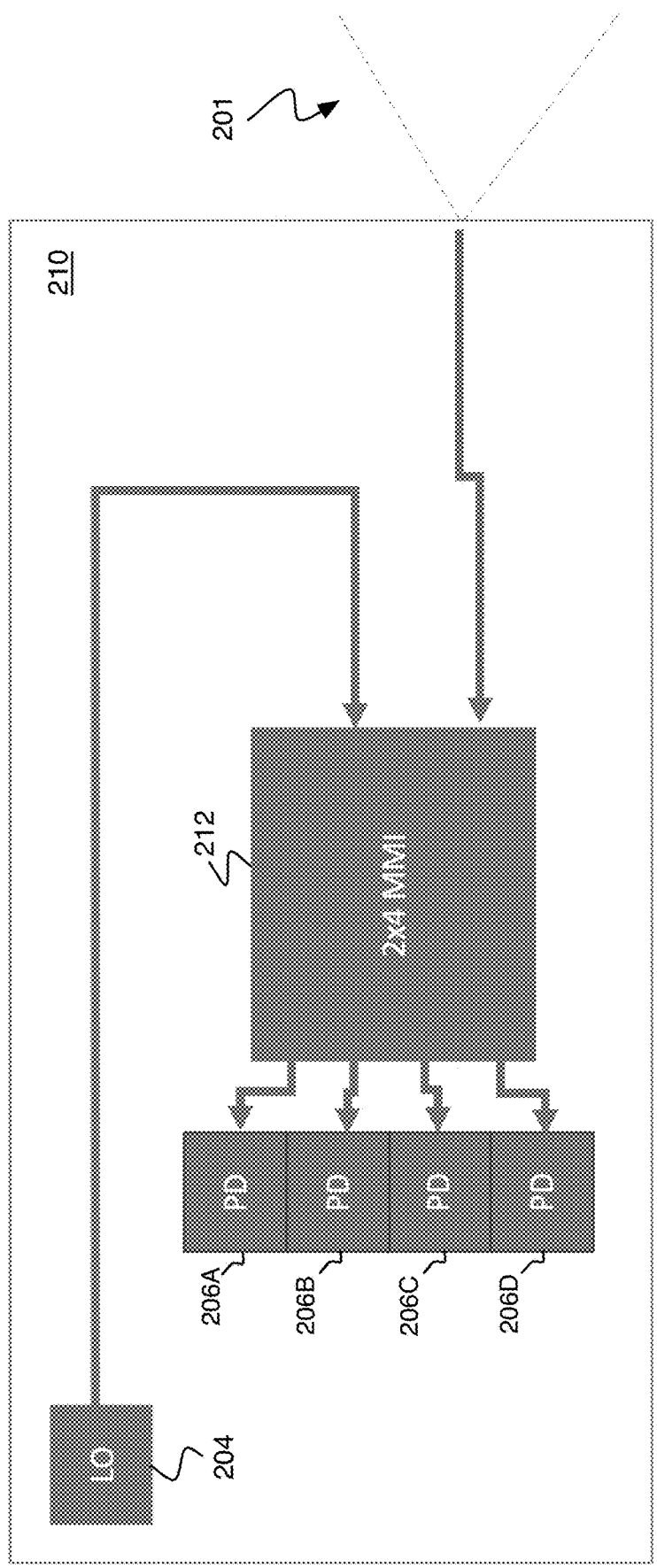

With this construction, phase can be recovered without the need for a frequency shifted carrier. Unbalanced detection as in the single mixer scheme is also possible, with similar limitations. FIG. 2B shows another alternative implementation of a coherent detector (210) in which a 2×4 coupler (212) is used instead of the two separate 2×2 couplers (202C) and (202D). In this implementation, the 2×4 coupler (212) is an MMI coupler that mixes the incoming field from the input aperture (201) with the LO from the LO source (204) with appropriate phase shifts at the four detectors (206A), (206B), (206C), and (206D).

In order to scan the field of view covered by the synthetic aperture of a detection array that includes multiple collection apertures, and recover a representation of object(s) reflecting light in the field of view (e.g., a 3D cloud map), digitized versions of the phasor at each collection aperture are combined. This combination effectively defines a virtual wavefront that corresponds to a desired direction within the field of view. Since this is a numerical calculation, it can be done simultaneously for all possible receiving directions within the field of view of the LIDAR system through the adjustment of the phase shifts done in the complex domain. This corresponds to a complex matrix multiplication, which can be done in a sequential calculation, for example, using a CPU of a computer, or can be done in a parallel calculation, for example, using FPGA/GPU hardware. These or any of a variety of computing modules can be used in any sequential, parallel, or combination of sequential and parallel, calculations.

Without being bound by theory, as an example of a formulation for some of the equations that can be used to perform some of the calculations, for a desired direction (θj, φj) in the field of view, the phase shift to apply to a specific aperture of coordinates (xi,yi,0) on the array and with phase error $\xi_i$, relative to the local oscillator reference, can be expressed as:

$$\Delta \psi_{i,j} = \frac{2\pi}{\lambda}[x_i \sin(\theta_j)\cos(\phi_j) + y_i \sin(\theta_j)\sin(\phi_j)] + \xi_i$$

If A is the matrix of complex amplitudes at all apertures in the array, a computing module can reconstruct the field of view as follows:

$$F = A \cdot M$$

And, a uniform transformation matrix can be expressed as:

$$M = e^{j\Delta \psi i,j}$$

Other transformation matrices are possible, where a series of amplitude factors is introduced to taper the equivalent radiation pattern of the array. In linear arrays with regular spacing, some characteristic designs include triangular shaped and binomial shaped field intensity from the array center. These designs suppress secondary lobes at the cost of a broader main radiation lobe. An alternative design may be based on Chebychev's polynomials, with Dolph's or Taylor's transforms, which allow setting an upper boundary to the secondary lobes while minimizing the width of the main lobe.

The spatial distribution of the collection apertures is an analogous sampling problem to that of antenna phased array designs. Different configurations are possible depending on the desired antenna pattern, and the lobe profile. Example arrangements of the array of collection apertures can include arrangements such as circular arrays, rectangular grids, etc., which can be used, analogously to systems that use arrays of antennas (e.g., RADAR systems). In some implementations, the number of apertures is large enough to enable high-resolution imaging of non-trivial scenes, and sufficient light collection for long-range imaging (e.g. >300 m).

In some implementations, the apertures can be arranged on sub-units of a non-planar formation that is able to self-assemble by application of a magnetic force, as described in more detail in U.S. Provisional Application Patent Ser. No. 62/842,924, filed May 3, 2019, incorporated herein by reference. For example, a plurality of sub-units are fabricated on a planar substrate, where each sub-unit comprises: an optical sensing structure configured to receive at least a portion of an optical wavefront that impinges on one or more of the sub-units, and material forming at least a portion of a hinge in a vicinity of a border with at least one adjacent sub-unit. At least a portion of the substrate is removed on respective borders between each of at least three different pairs of sub-units to enable relative movement between the sub-units in each pair constrained by one of the hinges formed from the material. One or more actuators are configured to apply a force to fold a connected network of multiple sub-units into a non-planar formation.

If a device that contains the components of the LIDAR system is implemented using integrated optics, for example, the arrangement of waveguides and apertures may be done in the plane of a surface of a wafer and optical elements at the end of the waveguides may be used to deflect optical radiation off-plane (e.g., perpendicular to the surface of the wafer). Such optical elements may include grating couplers, etched 45° mirrors, 3D printed micromirrors or external micromirrors, among others. Additionally, diffractive elements may be introduced in the design such as microlenses, in order to adapt the field of view of the design as described in US Publication No. 2017/0350965A1, incorporated herein by reference. These microlenses may be produced using grayscale lithography, resist reflow, imprint molding, or 3D printing techniques, among other methods.

In an integrated optics implementation, photodiodes and electronic amplifiers (e.g., transimpedance amplifiers (TIAs)) can be produced on the same substrate, minimizing system cost and reducing device footprint. This can be done through the application of CMOS compatible technologies. Electronics can be produced using a CMOS process and waveguides can be produced on top of the electronics layer using silicon, silica, silicon nitride or silicon oxynitride, for example. Photodetectors can be produced, for example, using germanium grown on the silicon wafer for longer wavelengths, or through silicon detectors available on the CMOS platform if the wavelength allows it.

The electronics for some implementations of the LIDAR system may include one or several amplifying stages configured to provide adequate transimpedance gain for each of the detectors or detector pairs in the device. Once amplified, the signal can be digitized and digitally processed (e.g., according to the equations above) to generate independent data streams that correspond to each of the desired viewing directions over the field of view. These data streams may then be processed to extract depth information (also called range information) using depth-extraction (or range-extraction) algorithms used in some other LIDAR systems. In chirped or frequency-modulated continuous-wave (FMCVV) systems, depth is encoded in the instantaneous frequency difference between the local oscillator and the frequency of the received light. In other schemes, phase differences when switching between two wavelengths or time measurements for pulsed schemes with heterodyne detection may be applied.

Figure 3:
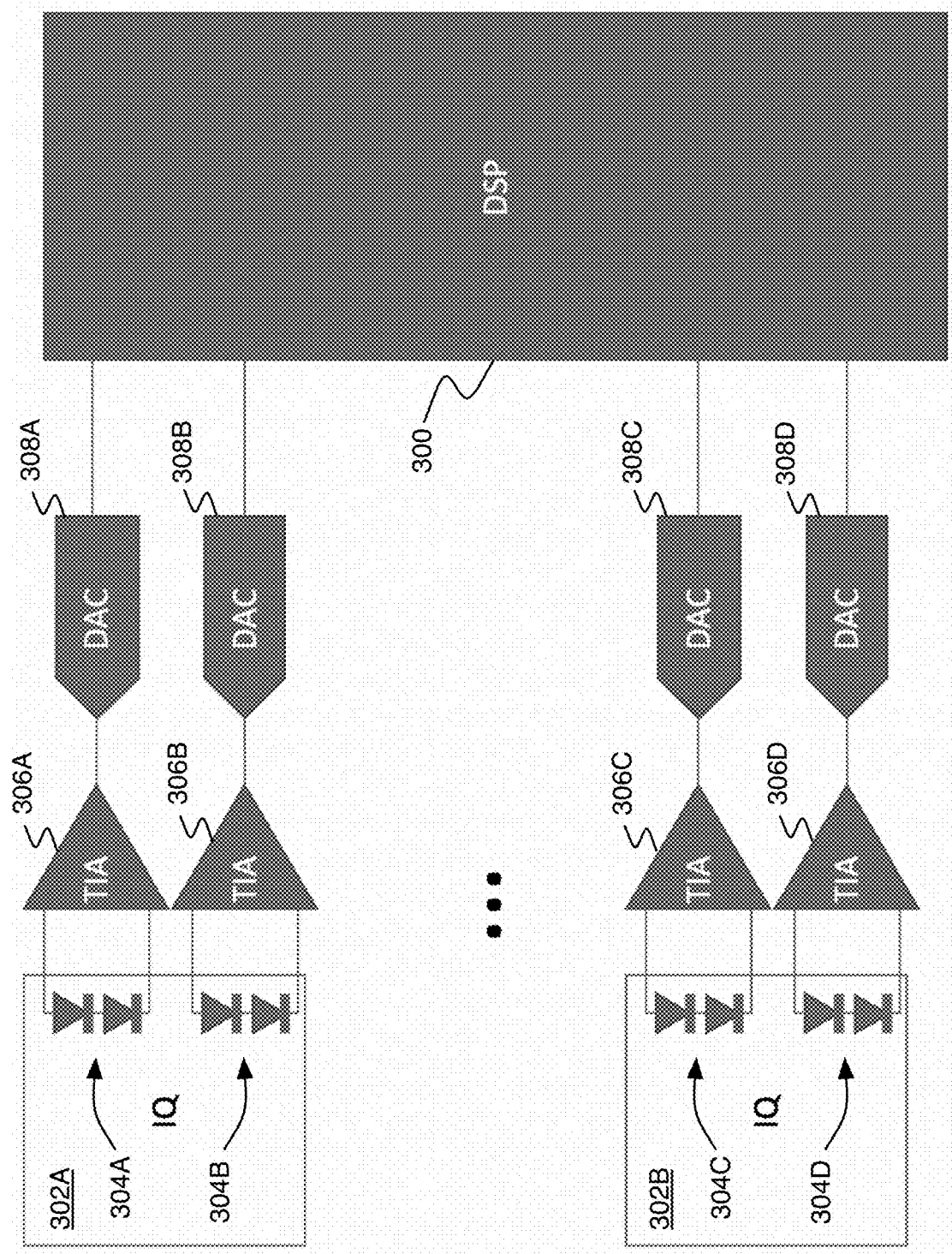
FIG. 3.—Shows a schematic diagram of an example reception subsystem.

The digital processing electronics can be made on the same substrate as the optical device or can be implemented on a separate dedicated device such as an ASIC chip. Off-the shelf components may also be used for this purpose, like FPGAs, DSPs or software implementations running on CPUs or GPUs. FIG. 3 shows an example of a digital signal processing (DSP) module 300 that is coupled to an array of IQ detectors (302A) . . . (302B) (for respective apertures in an aperture array) that can be integrated on the same device, or otherwise combined, in a reception subsystem. The IQ detector (302A) includes a pair of photodiodes (304A) for an in-phase (I) component and a pair of photodiodes (304B) for a quadrature (Q) component. The signals from the photodiodes (304A) and (304B) are amplified by respective TIAs (306A) and (306B), which are converted into the digital domain by respective DACs (308A) and (308B). Similarly, the IQ detector (302B) includes a pair of photodiodes (304C) for an I component and a pair of photodiodes (304D) for a Q component. The signals from the photodiodes (304C) and (304D) are amplified by respective TIAs (306C) and (306D), which are converted into the digital domain by respective DACs (308C) and (308D).

The data throughput that results from the number of channels for the multiple collection apertures, the scanned range over the field of view for a particular scene, and/or the scene acquisition rate can be large. In some applications, the same photonics platform that is being used to implement the described device may be used to encode and transmit the information optically back to the rest of the system.

Figure 4:
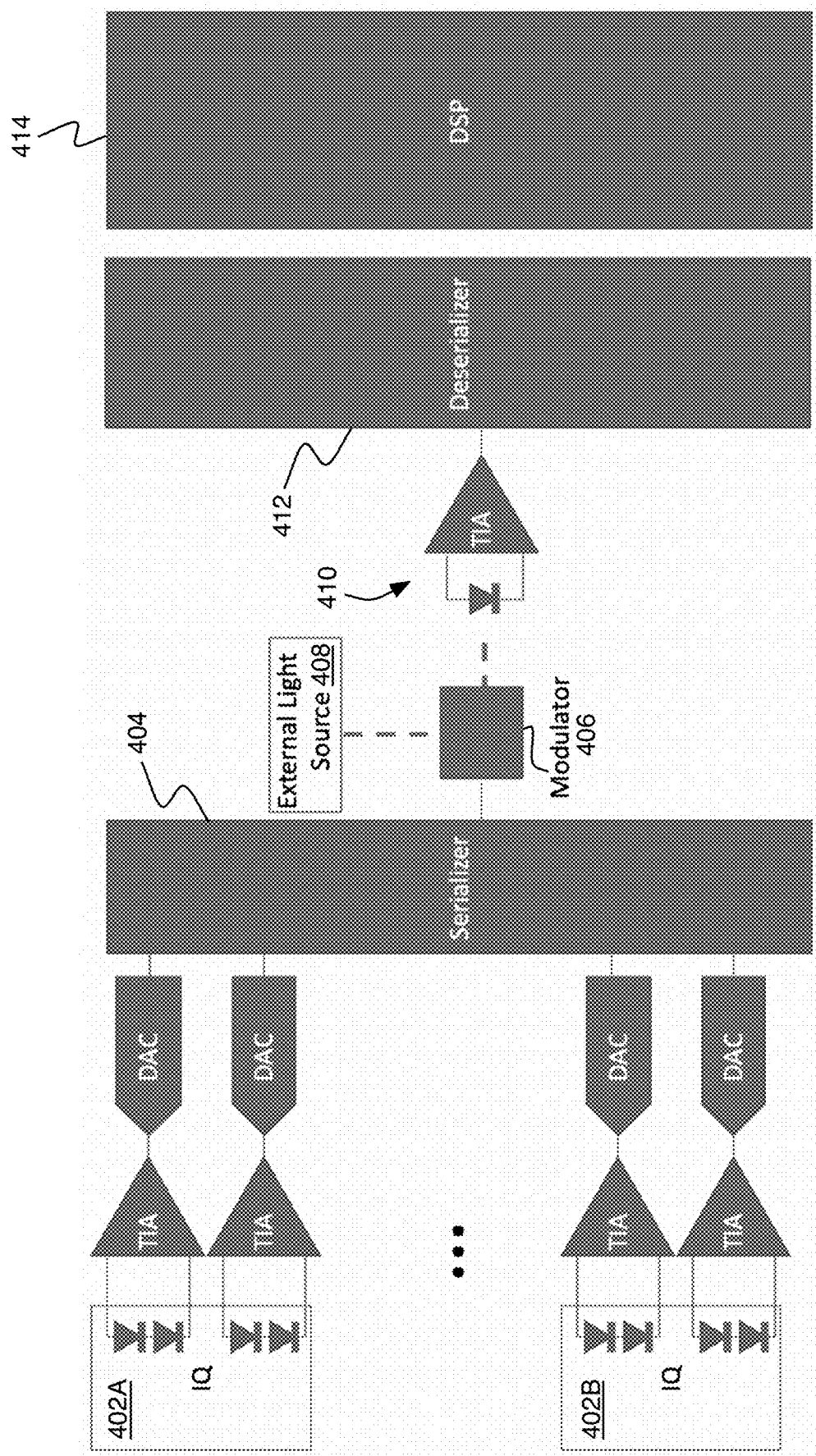
FIG. 4.—Shows a schematic diagram of an example reception subsystem.

This can be done, for example, through fast modulators based on carrier-injection in PIN devices or through other electro-optic effects. FIG. 4 shows an example of a reception subsystem in which data from an array of IQ detectors (402A) . . . (402B) (for respective apertures in an aperture array) are coupled to a serializer (404) that serializes the digital signals on-chip before the serialized output is amplitude modulated by a modulator (406) on an optical carrier from an external light source (408). A direct detection optical-to-electrical converter (410) and deserializer (412) can then provide the digital signals to a DSP module (414).

This on-chip optical communication channel can be multiplexed on the same optical path used to provide the local oscillator to the device using wavelength division multiplexing, through isolators/couplers to separate both propagation directions or using time multiplexing among other techniques. Alternatively, a separate physical path may be used for the encoded optical information, which may be of a different type than the single-mode optical fiber used for the laser providing the emitted and collected light and the local oscillator light. For example, this separate path for the encoded optical information may be a multi-mode optical fiber. This optical fiber communication of data can simplify the interface with the sensing element to just a few power/control electrical signals and one or two optical fibers.

The arrangement of waveguides may be configured to improve the performance of the device. Integrated optics in a photonic integrated circuit (PIC) has an advantage of the accuracy that is attainable with modern lithography, which can be significantly better than 100 nm in scale. It is possible to assemble some implementations of the device this using bulk optics and/or fiber optics instead of or in addition to integrated optics in a photonic integrated circuit. But, in some implementations that integrate all of the main optical components of the LIDAR system into a PIC, the dimensions and tolerances enabled by such an implementation may facilitate a more stable system, and the information may be easier to recover.

Another possible implementation is one where the distribution network is produced using a 3D printing technique of adequate resolution and satisfactory waveguide quality. Sufficient index contrast to implement the bends and low losses may be a factor for implementing such a system. Couplers used to provide the mixing function could be produced using planar-like structures or true 3D components like photonic lanterns. The 3D printed waveguides may be directed after mixing to a suitable detector array.

In the case of a FMCW system, in some implementations, the path length difference between, firstly, each optical path connecting each aperture and the respective mixer input, and, secondly, the optical path connecting the common input of the local oscillator to the coupler(s) generating the interference is substantially equal for all channels in the array. This will minimize the phase shift found between them during the wavenumber chirp characteristic of FMCW systems and will reduce the need for calibration and digital compensation of the transformation matrices above. Similarly, in other source modulation schemes that affect especially the wavelength of the local oscillator, the path length difference may be minimized to avoid introducing modulation-dependent phase errors in the relative phase measurements between apertures that impede proper direction recovery.

Equalization of arm lengths also helps with temperature sensitivity. Some materials that could be used to implement this example system, like monocrystalline silicon, have moderate to high thermo-optic effects. If the lengths leading from the local oscillator input to each mixer, or from the aperture to the mixer are different, changes in temperature may induce uncontrolled phase shifts in the array, resulting in a loss of calibration. In the case of silicon, which has a thermo-optic coefficient of 2.4×10-4 at 1.3 µm and assuming that the maximum phase error acceptable in the array is λ/100, the maximum tolerable path length difference could be selected to be no more than 54 µm per 1K of tolerated temperature variation, at a wavelength of 1.3 µm. If the chip is not to be thermalized and must operate over a temperature range of −20 to 80° C., the maximum tolerable path length difference could be selected to be no more than 0.54 µm.

In the case that the device is packaged or manufactured together with electronics or electro-optic components that dissipate heat, additional care may be paid to reduce any thermal gradient in the structure. Alternatively, materials with a lower thermo-optic coefficient, such as silicon oxide, nitride, or oxynitride, may be used for all waveguides or some sections of the optical circuit. Additionally, one or more temperature sensors could be included on the substrate used to fabricate this unit in order to estimate phase errors and be able to compensate them in post-processing.

Figure 5:
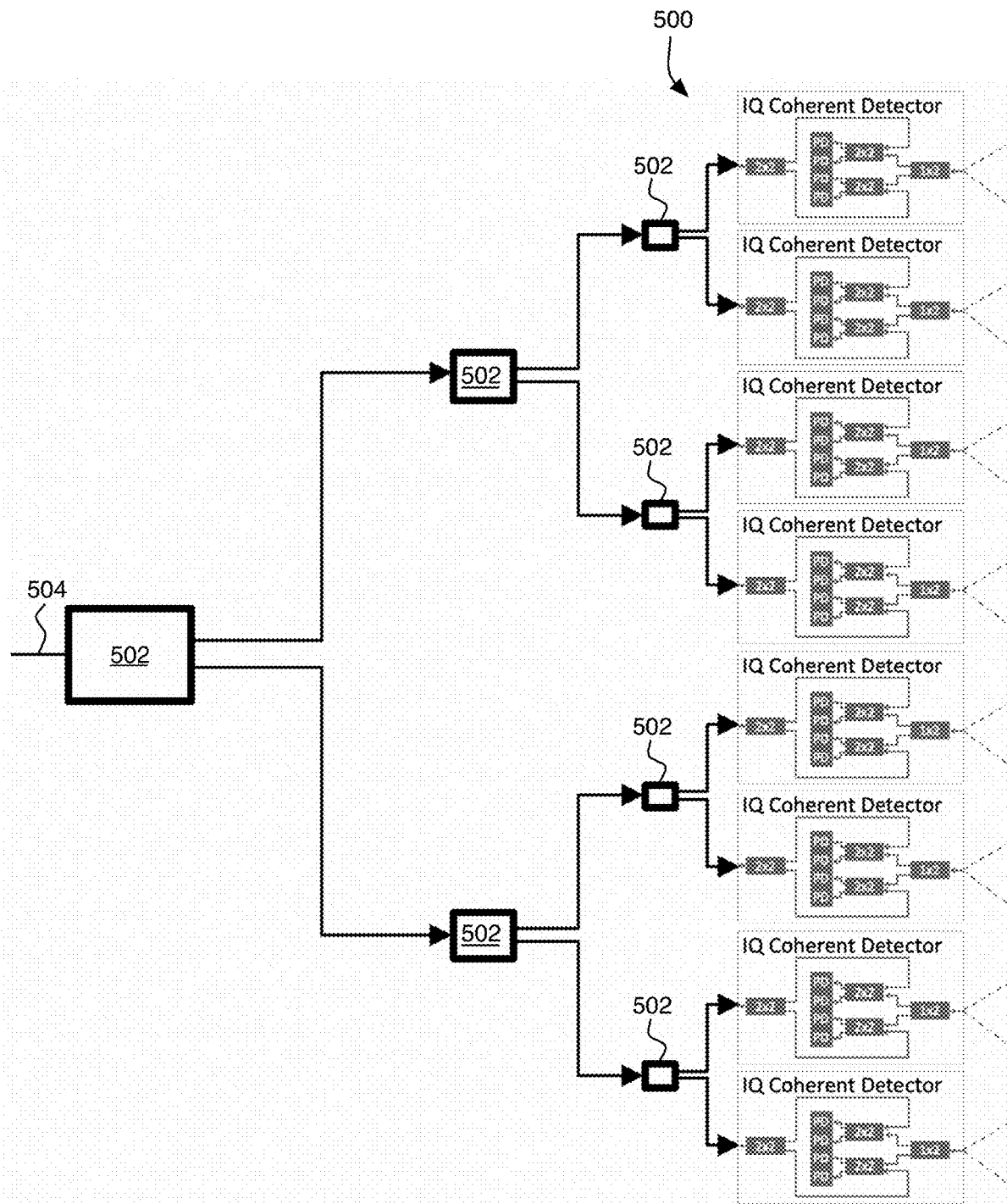
FIG. 5.—Shows a schematic diagram of an example reception subsystem with a distribution of a local oscillator with equalized arm lengths to each mixer.

The equalization of total path length for the total oscillator can be achieved, among other ways, through a binary splitting tree. An example of this scheme is shown in FIG. 5 for an example of a reception subsystem (500) including a small linear array of N apertures (e.g., N=8 in this example) coupled to IQ coherent detectors (e.g., the coherent detector 200 described above). Given that there are types of 1×2 splitters (502) that do not induce phase shifts between their two outputs, and that the tree can be configured to be symmetric at each stage, the phase and group delay for the LO between the general input (504) and the input of each IQ coherent detector can be configured to be substantially the same. The distance from the aperture to the mixer may be kept constant to ensure that phase delay is the same for all apertures.

Figure 6:
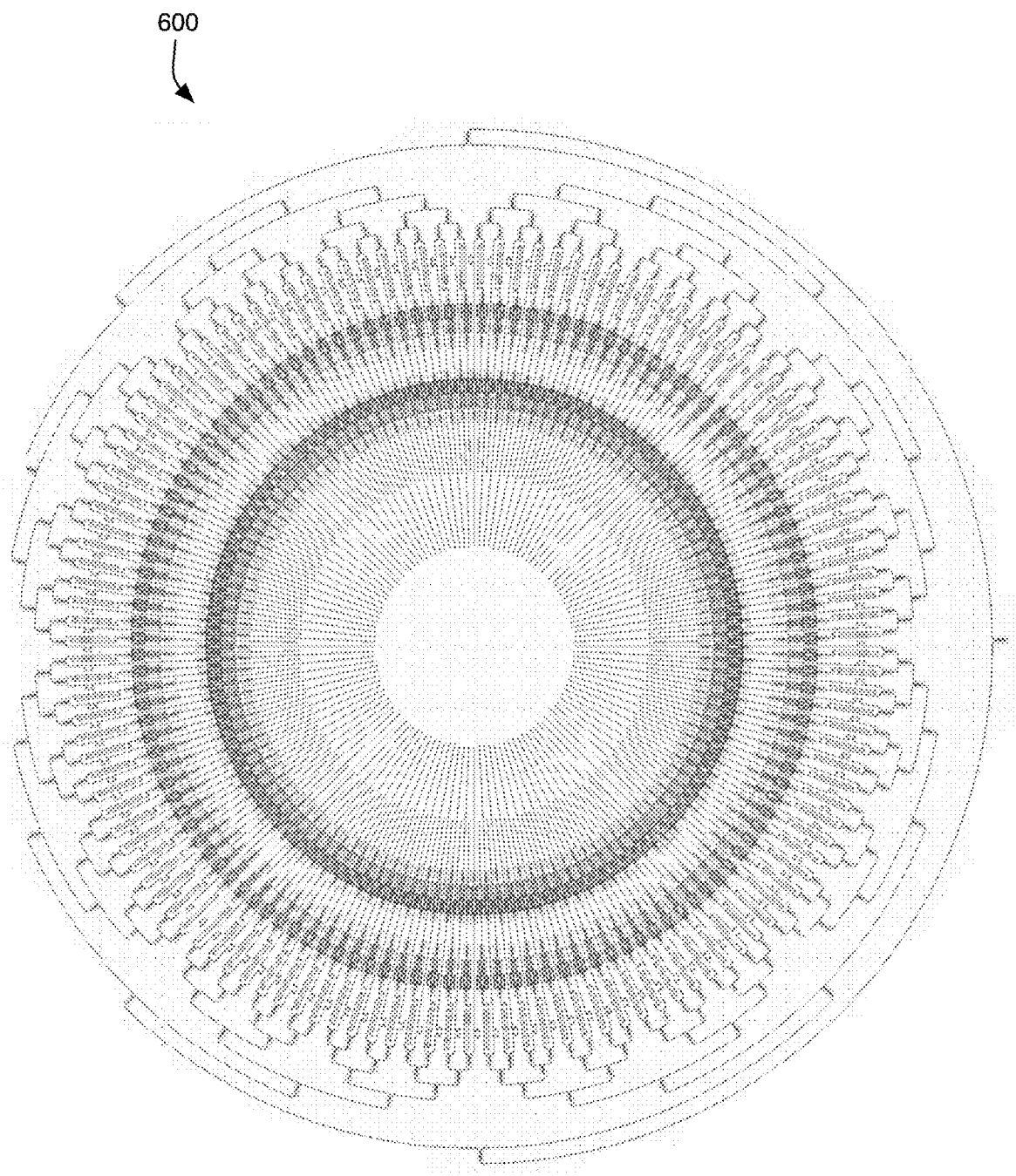
FIG. 6.—Shows an illustration of a mask layout with a circular distribution of the local oscillator with equalized arm lengths to each mixer, where the distribution of apertures defines two concentric circles.

Instead of a linear arrangement of apertures within an array of apertures, the geometry of the arrangement of apertures can be distributed over a 2-dimensional or 3-dimensional arrangement. For example, in the case of a circular geometry, the angular span and segment length after each splitter could be arranged to be substantially equal as exemplified in the example mask layout (600) shown in FIG. 6.

Figure 7:
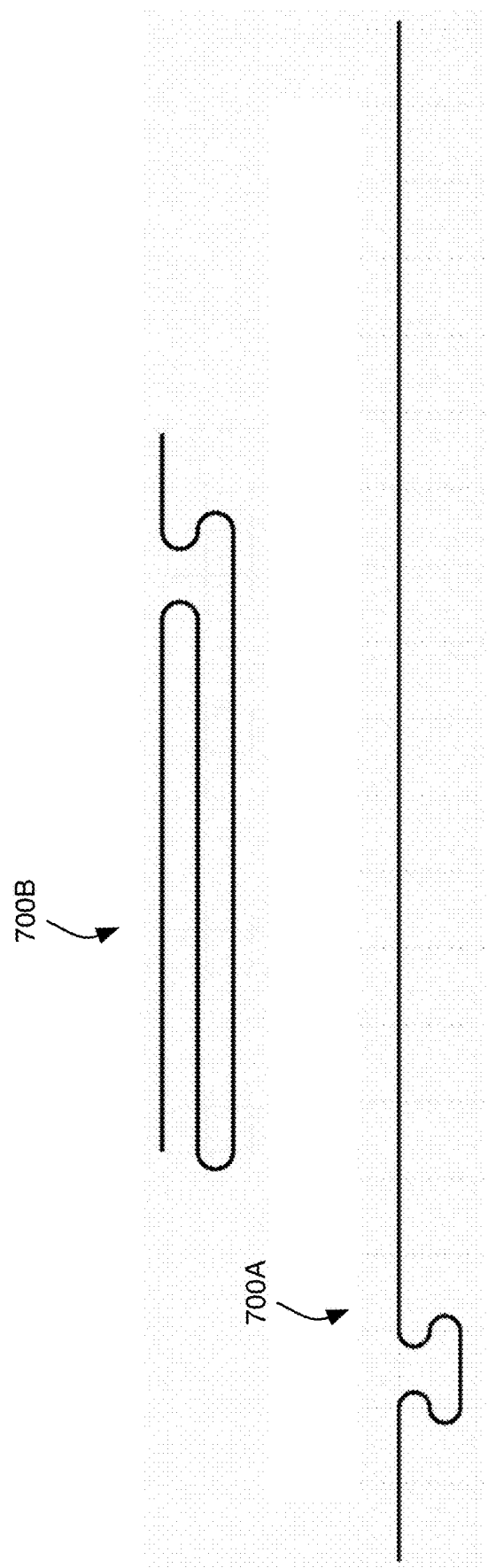
FIG. 7.—Shows an illustration of two waveguide segments with equal length, but different shift in the horizontal direction.

In the illustrated layout the apertures are arranged along two concentric rings and the distance from aperture to mixer has been kept constant. This has the advantage of producing alternating positions for the mixers, which are typically wider than individual waveguides. This interleaving allows an increase of aperture density in the rings. However, due to the lack of symmetry, the path lengths between the input of the local oscillator to the device and the different mixer inputs can be adjusted. To this end, it is possible to introduce compensation elements that adjust varying physical distances on the wafer but keep total optical delay constant, as shown in FIG. 7. A waveguide segment (700A) and a waveguide segment (700B) have different distances between their end points in the horizontal direction (e.g., in the plane of the array), but same propagation distance through the waveguide segment between those end points.

The emitting subsystem of a LIDAR system incorporating a reception subsystem that uses the detection array and processing techniques described herein can take any of a variety of forms such that the illumination beam covers the area of the scene which is of interest. For example, a single waveguide or aperture can be used alone, or combined with beam forming optics, to produce an illumination pattern that fully covers the field of view by the emitted beam. In this case, the reception subsystem is responsible for resolving the field of view (FOV) with the desired resolution.

Figure 8:
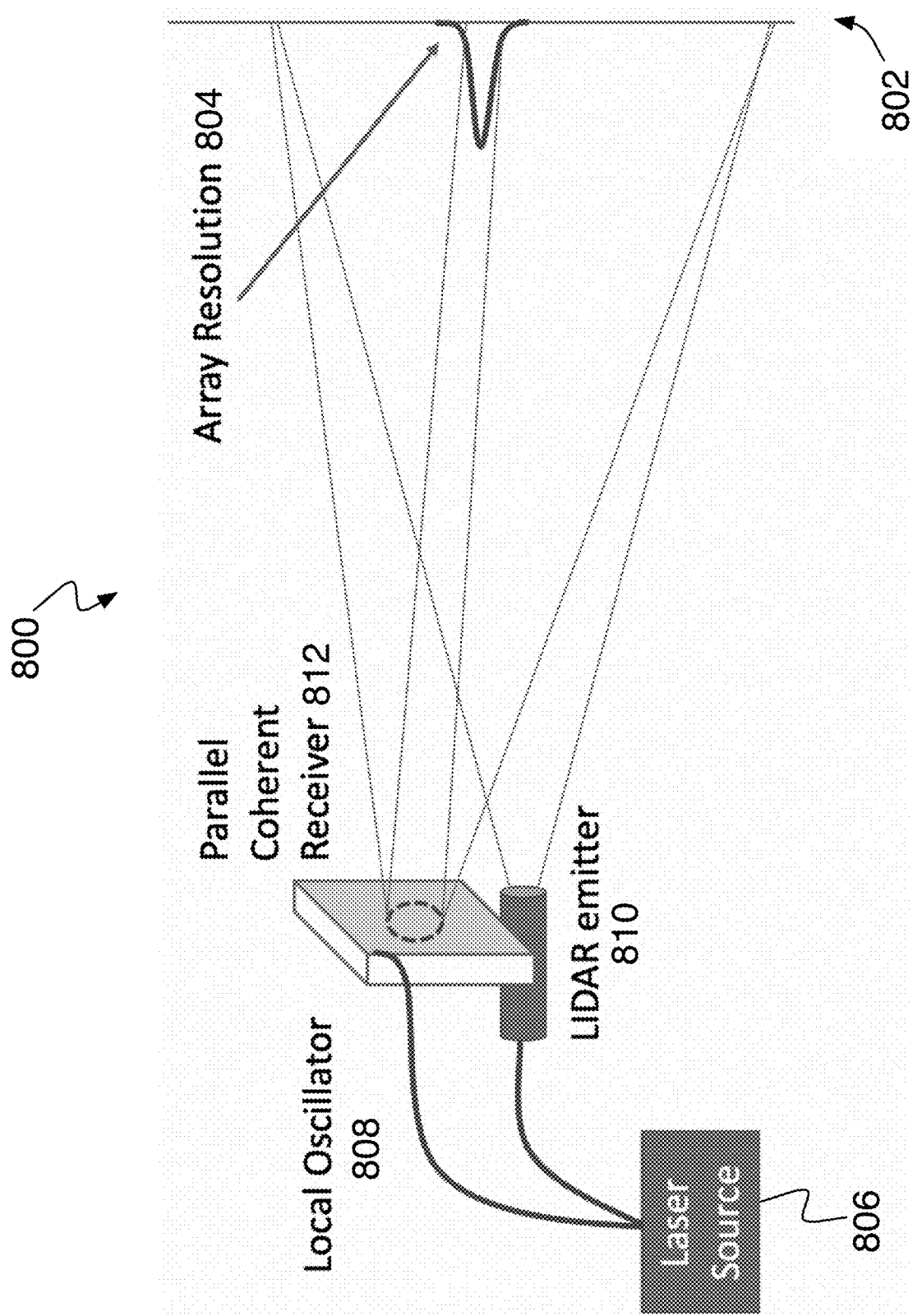
FIG. 8.—Shows a schematic diagram of the optical configuration for an example LIDAR system.

FIG. 8 shows an example of the emitter and receiver optical configurations of a LIDAR system (800) that includes an emitting subsystem (or "emitter") and reception subsystem (or "receiver"), and illustrates how the emitter covers the full FOV (802) and it is the signal processing in the receiver that selects a specific direction in the FOV (802) subject to the array resolution (804). In this example, a laser source (806) provides light as a local oscillator (808) and light to a LIDAR emitter (810) illuminating the FOV (802). A parallel coherent receiver (812) receives an optical wavefront over an array of multiple apertures. Each aperture is configured to receive a respective portion of the received optical wavefront. Also, different apertures (including different non-adjacent apertures) are configured to receive a respective portion of the received optical wavefront, where each of these portions of the optical wavefront includes a contribution from the same portion of the field of view.

Figure 9A:
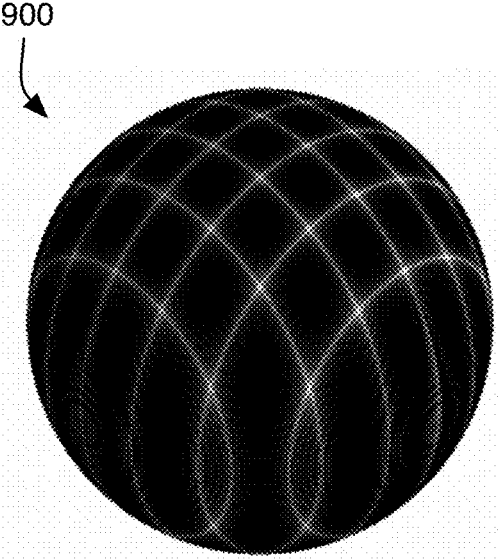
FIGS. 9A and 9B.—Show three dimensional plots of angular distributions of a radiation pattern over a sphere for flat arrangements of apertures.
Figure 9A:
Figure 9B:
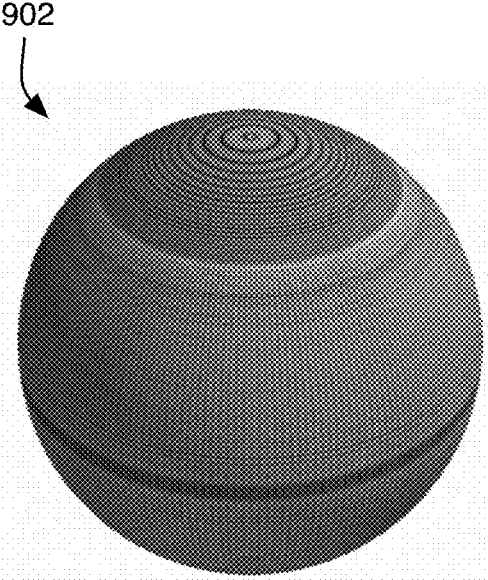
Figure 9B:
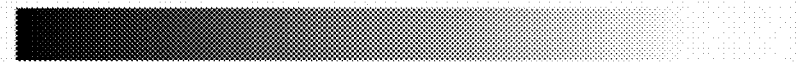

Alternatively, a phased array may be used to steer the excitation beam and scan the field of view. For the design of such a phased array, any of a variety of techniques and distribution schemes may be applied. FIGS. 9A and 9B show the spherical radiation patterns of a rectangular grid (FIG. 9A) and a circular array (FIG. 9B), with the maximum beam intensity defining the maximum of the scale and pointing in the direction of propagation to a target object. FIG. 9A shows a spherical radiation pattern (900) resulting from a 40×40 rectangular grid with a spacing of 3.8λ, and FIG. 9B shows a spherical radiation pattern (902) resulting from a circular array with (600) elements and a spacing of 1.6λ. Below each radiation pattern is a legend showing correspondences between shading intensity and relative radiation intensity (in dB). No consideration of the aperture's antenna function has been made in these examples.

As a further option, a MEMS device or another electromechanical device may be used to provide a scanning function for the emitter. In these cases, selection of an angular direction by the overlap between excitation scanner and the collection array may be the basis for an anti-aliasing suppression scheme (e.g., either through a Vernier distribution of the aliasing replicas of the emission and collection arrays or spatial filtering through the usage of a FOV in excitation that is smaller than the aliasing angular period).

When the excitation beam is steered to scan over different subsets of a larger field of view, the calculations used to determine direction-based information, such as data streams that correspond to different viewing directions over the field of view, can be used to scan over each subset. Also, when collecting the received data for a given subset, different parameters (e.g., integration time) can be used for different subsets of the field of view.

The techniques described herein may address various potential technical issues, some of which are relevant to ensuring high-speed long-range LIDAR detection. This may be useful to improve safety in autonomous vehicles and other applications, such as aerospace, where an extended range is of benefit.

The range limitation in existing systems is linked to the maximum power that can be used at a given wavelength and the sensitivity that can be achieved using a given detector technology. The maximum beam power used to illuminate a scene may be limited by practical considerations in the instrumentation and by safety limits for eye exposure. These limits depend on the wavelength, with shorter light wavelengths having more stringent restrictions due to the lower absorption in the eye. Longer wavelengths are inherently safer. Additionally, the physical properties of the beam are relevant for the calculation of eye safety. The maximum power in a collimated beam like the ones used in LIDAR depends on beam's diameter and the possible intersection of the beam with the eye pupil. In any case, for a given choice of wavelength and optical design, there is a maximum power that can be used safely. The present description shows how by moving the scene imaging functionality to a receiver array, it is possible to use an illumination beam that is as broad as the complete field of view and given its larger divergence either more powerful or inherently safer.

In terms of sensitivity, different sensitivity issues arise for different systems, such as time-of-flight systems and heterodyne or CW systems. Time of flight systems may suffer from inferior sensitivity relative to heterodyne systems, as electronics noise can easily go above shot noise for very weak signals. Heterodyne systems may benefit from a first level of optical "gain", stemming from the interference between the detected reflections in the field of view and a reference signal.

Although efforts to develop single-photon avalanche diode (SPAD)-based detector arrays may improve sensitivity in intensity-based systems, the improvement may be limited by device non-idealities and may introduce other design compromises. Photodiode arrays are normally made out of silicon because of its high integration capacity and its low cost. In practice, this limits the operating range of a time-of-flight LIDAR system to wavelengths <1 μm, which is the minimum energy to generate an electron-hole pair given the silicon bandgap. In turn, this may be sub-optimal from an allowable optical power perspective.

A further potential advantage of heterodyne systems is that they provide an inherent protection against crosstalk between multiple devices looking at the same FOV. In time-of-flight systems, it may not be possible to discriminate between pulses coming from different emitters. However, given that heterodyne systems use a local oscillator to produce interference with the reflected signal, independent emitters will be generally incoherent with each other.

A potential problem with FMCW systems is that they typically have a limited étendue (AΩ), since each beam's solid angle determines LIDAR resolution. This limits the system's ability to collect reflected photons. The present description shows how this limitation can be addressed, increasing the system étendue and optical throughput while moving the imaging functionality to a detector array and still enabling static single-beam illumination. Replicating the number of beams in rotational scanners can increase scanning speed but may add complexity and cost.

The described features can improve the performance of LIDAR systems through different mechanisms, including the following two mechanisms:

1. Increase the number of collection apertures without limiting brightness through reciprocity losses in phase-shifted antenna arrays. Higher signals mean that longer ranges can be achieved and faster scanning is possible.

2. Reconstruct the field of view through a single measurement of the complex field at each aperture and a mathematical transform. This eliminates the need to scan the phases of each aperture in order to generate a movable radiation pattern for the array.

In order to increase some of these benefits, an FMCW detection scheme can be used, as heterodyne gain can be used to increase the signal above the level of electrical noise and good axial resolution and range are attainable. Other heterodyne schemes, like dual wavelength LIDAR, are also applicable to some implementations of the system.

The issues of range and speed can be simultaneously addressed by increasing the output optical power of the emitter. However, there are safety limits to the amount of laser power that can be put into a collimated beam. This safety power threshold can create a limitation to the performance of some systems.

Instead of reducing scanning to a mathematical transform on the data collected from an array, it is possible to actually steer the beam through phase shifters. However, these phase shifters may need calibration due to fabrication tolerances. Also, the cascaded mixing of the received signals reduces the light collection efficiency on reception and, depending on the actuation mechanism used for the phase shifter, the resulting beam steering may result too slow for some applications.

A potential advantage of the described techniques is the increase in étendue ($A\Omega$) obtained from the array. For a single collection aperture this etendue is minimal and basically defined by the wavelength: $A\Omega \sim \lambda 2$. This limits the ability of the aperture to collect back-scattered light in a general illumination setting. If multiple waveguides are combined using typical phased array constructions, essentially the same etendue and brightness results as one would get for a single waveguide.

One way to see this is through the reciprocity losses in the couplers as the different aperture contributions are combined together. However, in the described techniques, light collected at each aperture is mixed with a local oscillator and detected without intrinsic loss. Since all photons collected from all apertures interfere, the signal-to-noise ratio of the system increases with a factor N for a uniformly illuminated scene. This allows the system to scan at higher speeds, at it needs to wait shorter to reach a sufficient level of photons to call a detection.

A potential issue with some implementations is the presence of phase and group delay errors between the apertures. This can be reduced during design, using the capabilities of high-resolution lithography to reduce the geometrical differences between LO paths. Additionally, external parameters affecting the group and phase refractive indices can be taken into account; for this, the corresponding waveguides can be kept relatively short, and/or can run close to each other and exhibit symmetry to minimize differential errors.

It is also possible to carry out a device calibration using a well-known excitation (e.g., a collimated beam) and store it as a compensation matrix to be multiplied with the geometrical transform matrix defined above.

Some implementations of the described techniques use a coherent source with sufficient coherence length to ensure interference throughout the desired depth scanning range.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

The invention claimed is:

1. An apparatus for managing coherent detection from multiple apertures in a LIDAR system, the apparatus comprising:

a first optical source or port providing a modulated illumination optical wave illuminating a field of view;

a second optical source or port providing a reference optical wave that has a defined phase relationship to the modulated illumination optical wave;

an aperture array that includes a plurality of apertures arranged over one or more dimensions, and that is configured to receive an optical wavefront that includes contributions over at least a portion of the field of view, where:

each of two or more of the apertures is configured to receive a respective portion of the received optical wavefront, and at least two non-adjacent apertures in the aperture array are configured to receive a respective portion of the received optical wavefront that includes a contribution from the same portion of the field of view, and each of two or more of the apertures is coupled to a respective optical mixer that coherently interferes the respective portion of the received optical wavefront with a respective local oscillator optical wave; where each respective local oscillator wave is derived from the reference optical wave such that, for each respective aperture, respective differences in group delay, between (i) the second optical source or port and the respective optical mixer, and (ii) the respective aperture and the respective optical mixer, are substantially equal; and a processing module configured to process electrical signals detected from outputs of the optical mixers, the processing including:

for each optical mixer of a plurality of the optical mixers, determining at least one of phase or amplitude information from at least one electrical signal detected from at least one output of a corresponding optical mixer, determining first direction-based information, associated with a first subset of the field of view, based on phase or amplitude information derived from at least two optical mixers of the plurality of the optical mixers, determining first distance information from the first direction-based information, determining second direction-based information, associated with a second subset of the field of view, based on phase or amplitude information derived from at least two optical mixers of the plurality of the optical mixers, and determining second distance information from the second direction-based information.

2. The apparatus of claim 1, wherein the modulated illumination optical wave has a frequency spectrum that includes a peak at a frequency that is tunable to provide a frequency modulated continuous wave (FMCW) illumination optical wave.

3. The apparatus of claim 1, wherein the modulated illumination optical wave is a pulsed signal.

4. The apparatus of claim 1, wherein the modulated illumination optical wave is formed by alternation of light of two wavelengths.

5. The apparatus of claim 1, wherein the modulated illumination optical wave has a spectrum covering different frequency bands.

6. The apparatus of claim 1, wherein the respective differences in group delay, between (i) the second optical source or port and the respective optical mixer, and (ii) the respective aperture and the respective optical mixer, correspond to an optical path length difference of less than 10 cm.

7. The apparatus of claim 6, where the respective differences in group delay, between (i) the second optical source or port and the respective optical mixer, and (ii) the respective aperture and the respective optical mixer, correspond to an optical path length difference of less than 1 cm.

8. The apparatus of claim 1, wherein the first and second direction-based information is further processed to measure the first and second intensity of the light coming from the first and second subsets of the field of view, respectively.

9. The apparatus of claim 1, wherein the first and second direction-based information is further processed to measure the relative speed of one or more objects reflecting the light coming from the first and second subset of the field of view, respectively.

10. The apparatus of claim 1, wherein at least a portion of the first direction-based information and at least a portion of the second direction-based information are determined in parallel.

11. The apparatus of claim 1, wherein the illumination optical wave is provided to illuminate the entire field of view at the same time.

12. The apparatus of claim 1, wherein the illumination optical wave is provided to scan different portions of the field of view over time.

13. The apparatus of claim 1, wherein one or more of the apertures in the aperture array are used to emit at least a portion of the illumination optical wave.

14. The apparatus of claim 1, further comprising at least one illumination aperture that is not included in the aperture array, where the illumination aperture is configured to emit at least a portion of the illumination optical wave.

15. The apparatus of claim 1, wherein the aperture array has its apertures disposed in a regularly spaced rectangular grid.

16. The apparatus of claim 1, wherein the aperture array has its apertures disposed in a regularly spaced polar grid.

17. The apparatus of claim 1, wherein the aperture array has its apertures disposed in a Mills cross configuration.

18. The apparatus of claim 1, wherein the aperture array has its apertures disposed in a pseudo-random configuration.

19. The apparatus of claim 1, wherein the aperture array is defined by the pixels of an imaging sensor.

20. The apparatus of claim 1, wherein the respective mixer is configured to provide in-phase/quadrature (I-Q) detection through the use of a 90° shifted replica of the reference optical wave.

21. The apparatus of claim 1, wherein the respective mixer is configured to provide in-phase/quadrature (I-Q) detection through the use of interference with the reference optical wave in a multimode interference coupler.

22. The apparatus of claim 1, wherein the mixers are implemented through at least one of: a partially transmissive layer, a directional coupler, an evanescent coupler, a multimode interference coupler, or a grating coupler.

23. The apparatus of claim 1, wherein the processing module is configured to compensate errors in a relative phase between apertures in the aperture array, estimated based at least in part on a modulation pattern of the modulated illumination optical wave.

24. The apparatus of claim 1, wherein the processing module is configured to compensate errors in a relative phase between apertures in the aperture array, estimated based at least in part on calibration data obtained with a predetermined wavefront.

25. The apparatus of claim 1, wherein the processing module is configured to compensate errors in a relative phase between apertures in the aperture array, estimated using sensors measuring temperature, and/or temperature gradients in the apparatus, and/or its environment.

26. The apparatus of claim 1, wherein the processing module comprises analog to digital conversion components.

27. The apparatus of claim 1, wherein the processing module comprises a data serializer.

28. The apparatus of claim 1, wherein the processing module comprises an electro-optical transducer for data output through an optical fiber link.

29. The apparatus of claim 1, wherein the first optical source or port and the second optical source or port provide light from a single common light source.

30. The apparatus of claim 1, wherein the second optical source or port provides light by phase modulation of light fed to the first optical source or port.

31. The apparatus of claim 1, wherein the first optical source or port illuminates the field of view through a light diffusing element.

32. A method for managing coherent detection from multiple apertures, the method comprising:

providing, from a first optical source or port, a modulated illumination optical wave illuminating a field of view;

providing, from a second optical source or port, a reference optical wave that has a defined phase relationship to the modulated illumination optical wave;

receiving an optical wavefront that includes contributions over at least a portion of the field of view at an aperture array that includes a plurality of apertures arranged over one or more dimensions, where:

each of two or more of the apertures is configured to receive a respective portion of the received optical wavefront, and at least two non-adjacent apertures in the aperture array are configured to receive a respective portion of the received optical wavefront that includes a contribution from the same portion of the field of view, and each of two or more of the apertures is coupled to a respective optical mixer that coherently interferes the respective portion of the received optical wavefront with a respective local oscillator optical wave; where each respective local oscillator wave is derived from the reference optical wave such that, for each respective aperture, respective differences in group delay, between (i) the second optical source or port and the respective optical mixer, and (ii) the respective aperture and the respective optical mixer, are substantially equal; and processing, in a processing module, electrical signals detected from outputs of the optical mixers, the processing including:

for each optical mixer of a plurality of the optical mixers, determining at least one of phase or amplitude information from at least one electrical signal detected from at least one output of a corresponding optical mixer, determining first direction-based information, associated with a first subset of the field of view, based on phase or amplitude information derived from at least two optical mixers of the plurality of the optical mixers, determining first distance information from the first direction-based information, determining second direction-based information, associated with a second subset of the field of view, based on phase or amplitude information derived from at least two optical mixers of the plurality of the optical mixers, and determining second distance information from the second direction-based information.

* * * * *